United States Patent [19]

Lebizay et al.

[11] Patent Number: 4,833,670

[45] Date of Patent: May 23, 1989

[54] CROSS-POINT BIT-SWITCH FOR COMMUNICATION

[75] Inventors: Gerald Lebizay, Vence, France; Yeong-Chang Lien, Briarcliff Manor, N.Y.; Kioshi Maruyama, Campbell, Calif.; Stanley E. Schuster, Granite Springs, N.Y.

[73] Assignee: International Business Machines Corporation, Armonk, N.Y.

[21] Appl. No.: 896,771

[22] Filed: Aug. 15, 1986

[51] Int. Cl.[4] .............................................. H04Q 11/04
[52] U.S. Cl. ........................................ 370/58; 370/63
[58] Field of Search ..................... 370/58, 60, 67, 14, 370/6, 63, 86; 340/825.79, 825.05

[56] References Cited

U.S. PATENT DOCUMENTS

| | | |
|---|---|---|
| 3,909,786 | 9/1975 | Lawrence ............................. 370/63 |
| 4,064,369 | 12/1977 | Battocletti ............................ 370/14 |
| 4,313,033 | 1/1982 | Walker et al. ....................... 370/62 |
| 4,628,493 | 12/1986 | Nelson et al. ....................... 370/100 |
| 4,658,397 | 4/1987 | Kawamura et al. ................. 370/63 |
| 4,683,564 | 7/1987 | Young et al. ..................... 340/825.79 |
| 4,710,920 | 12/1987 | Manning ............................. 370/100 |

Primary Examiner—M. H. Paschall
Attorney, Agent, or Firm—Douglas W. Cameron

[57] ABSTRACT

A method and apparatus to provide high speed voice/-data switching with efficient utilization of available bandwidth and minimal switching delay. More specifically, this invention uses shift registers at each crosspoint of a switching matrix. In each slot position of the register, there is a bit representing the status of an associated crosspoint during a particular time slot. Each slot position of the register represents a different time slot. The status of the crosspoint changes in accordance with the bit that is in a designated slot position during each time slot. During each time slot, at most one bit of data/voice is then transmitted through any given closed crosspoint.

10 Claims, 5 Drawing Sheets

FIG. 2
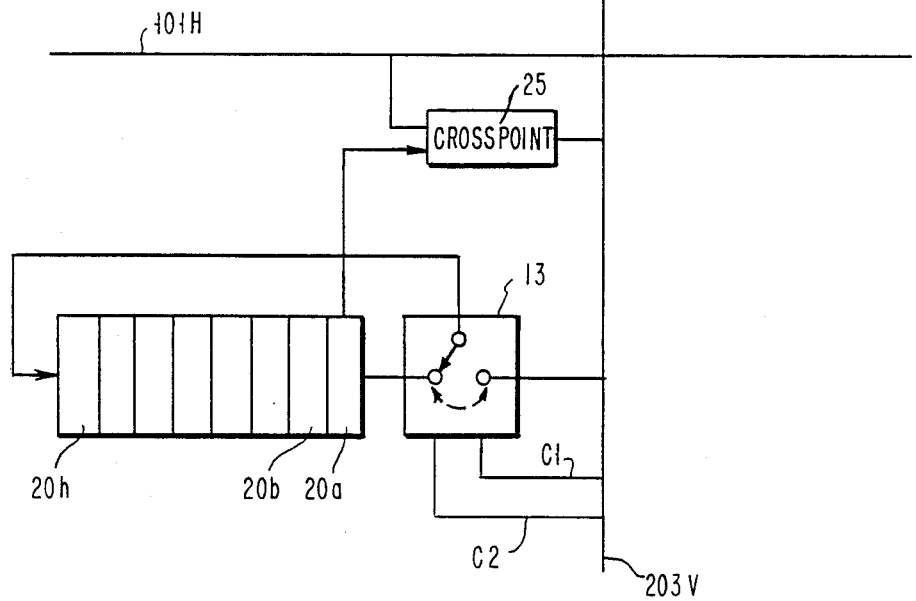
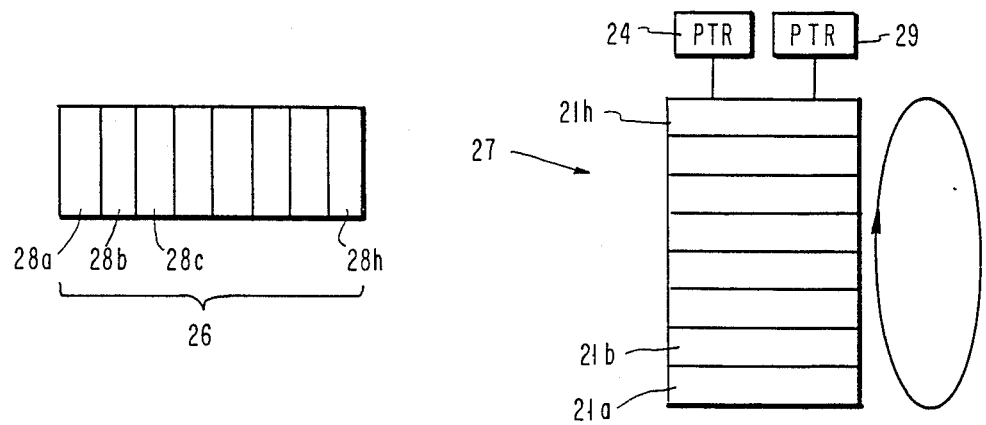

BIT INTERLEAVING

CROSS-POINT BIT-SWITCH FOR COMMUNICATION

DESCRIPTION

1. Technical Field

This invention relates to a method and apparatus to provide high speed-high bandwidth switching through a crosspoint switching matrix. More specifically, this invention uses shift registers for each crosspoint of the switching matrix. Bits, which indicate the status of a switch, are in the slot positions of the registers. These bits are shifted to change the status of the switches in the crosspoint switching matrix.

2. Background of the Invention

Various schemes have been used to provide for integrated voice data switching through a crosspoint switching matrix, however, they are not without shortcomings.

In U.S. Pat. Nos. 4,445,213 and 4,251,880, transmission on a single link is divided into slots wherein voice and data are interleaved. Various protocols are used in managing these slots to fit specific applications. For example, in voice sampling using the PCM scheme, the sampling period is 125 $\mu$sec. The above "time slot" systems results in a 125 $\mu$sec frame delay.

Another scheme to provide switching through a crosspoint stitching matrix is described in U.S. Pat. No. 4,068,215 to Mukaemachi et al.

This patent discloses a crosspoint switching matrix which has a latch associated with each crosspoint. Signals are then impressed on respective latches to control the status of various crosspoints. The write/read operations are then performed sequentially one crosspoint at a time, resulting in considerable switching delay.

U.S. Pat. No. 4,097,693 to J. A. Greefkes and U.S. Pat. No. 4,380,064 to H. Ishikawa et al disclose crossbar switching matrices which have circulating memories. Addresses representing specific crosspoint are stored in specific locations in the circulating memories to control the status of various crosspoints in specific time slots. However, the need to transfer address information in the memories and decoders then results in a considerably large slot. In the state of the art of TDM switches, a slot is usually 8 bits or longer in length. This large slot size further results in considerable switching delay.

Another problem associated with storing multiple bits in a slot is the inefficient use of bandwidth for data or voice that is transmitted in data units wherein the number of bits per data unit is not a integral multiple of the number of bits in a slot. For example, suppose each slot contains eight bits and the data to be transmitted has 9 bits per data unit. (8 bits for the actual data to be transmitted and one error bit). In this case two slots would be needed for the 9 bits. Thus, only nine out of sixteen available bits of bandwidth would be used. Also, a given transmission channel must use one or an integral number of slots to meet channel bandwidth requirement. If there are multiple bits in each slot, it is likely that the given transmission channel will use only a fraction of the bits in a number of slots, resulting in inefficient utilization of bandwidth.

U.S. Pat. No. 3,573,381 to M. J. Marcus, discloses a crosspoint switching matrix in which storage is provided at each crosspoint in a matrix. The storage is used to buffer one frame of information and rearrange slots in that frame. In the following frame, the rearranged information is dumped to the output. This buffering results in a full frame of switching delay.

Consequently a need exists for improvements in the methods and apparatus for switching voice and data with a variety of speeds through a crosspoint switching matrix, especially in reducing switching delay and increasing the utilization of existing bandwidth.

SUMMARY OF THE INVENTION

The present invention provides a method and apparatus to satisfy the aforementioned needs. More specifically, switching delay is reduced to a minimum and data of a variety of speeds can be integrated without inefficient use of switch bandwidth.

Accordingly, the present invention relates to a bit switch comprising a plurality of crosspoints with a circulating memory associated with each crosspoint or associated with a group of crosspoints. Each memory is used for storing a plurality of bits. Each bit defines the status of an associated crosspoint within a particular time slot which corresponds to the respective slot position in which the bit is stored. Or, a combination of bits defines the statuses of a group of crosspoints within a particular time slot which corresponds to the respective slot position in which the bits are stored. The present invention also comprises a means for shifting the bits in each respective memory simultaneously with the shifting of bits in each other memory. The bit, which is shifted to a designated position of each memory during a particular time slot, is used to define the status of its associated crosspoint during that particular time slot. The "status" of a crosspoint refers to whether the crosspoint is opened or closed. Also comprised in the present invention is a means for loading the bits in each memory associated with each crosspoint.

The present invention, also relates to a method of stitching voice and data of various speeds through a crosspoint switching matrix. This method comprises the steps of storing a plurality of bits in each circulating memory with a particular memory being associated with each crosspoint or associated with a group of crosspoints of the switching matrix. The bits are stored in respective slot positions of the respective memories with generally one bit in each slot position. Each stored bit represents the status of a respective crosspoint during particular time slots which correspond to the respective slot positions. Or, a combination of bits defines the statuses of a group of crosspoints within a particular time slot which corresponds to the respective slot position in which the bits are stored. The bits in the circulating memories are then shifted simultaneously in response to a single bit. The statuses of the crosspoints are then changed in response to the shifting of the bits in each respective memory which is associated with each crosspoint.

Most significantly, this invention allows the status of the crosspoints to change one time slot at a time wherein only one bit is transmitted through each crosspoint per time slot.

BRIEF DESCRIPTION OF THE DRAWINGS

FIG. 2 is a schematic representation of a crosspoint switch and its associated circulating memory. Also shown is a frame with a plurality of slots. Shown also is an alternative circulating memory (RAM) and a pointer to various time slots thereof.

DESCRIPTION OF THE PREFERRED EMBODIMENT

Figure 1:
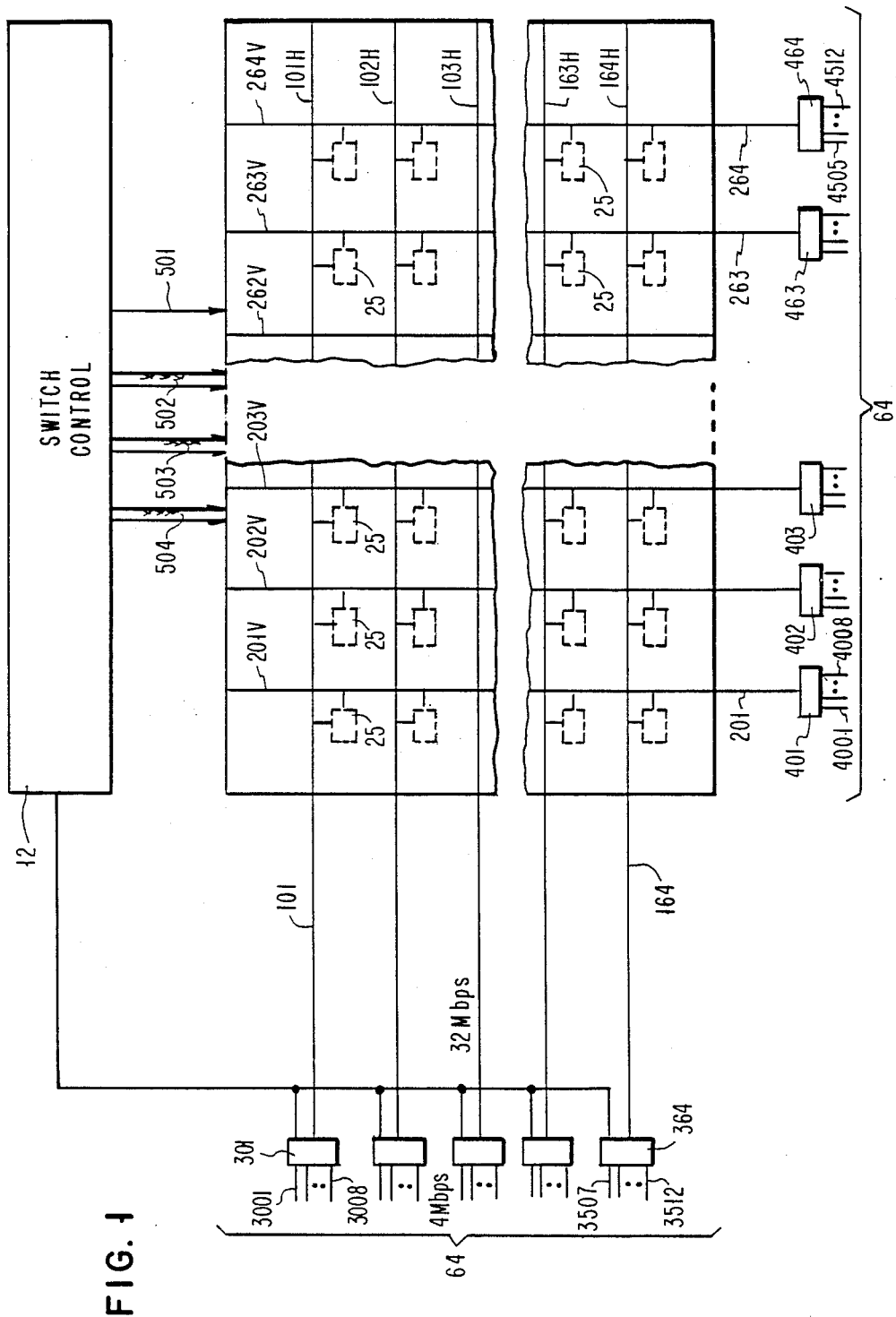
FIG. 1 is a schematic representation of the overall apparatus (bit switch) used in this invention. More specifically, a crosspoint bit switching chip and switch control chip are shown.
Figure 3:
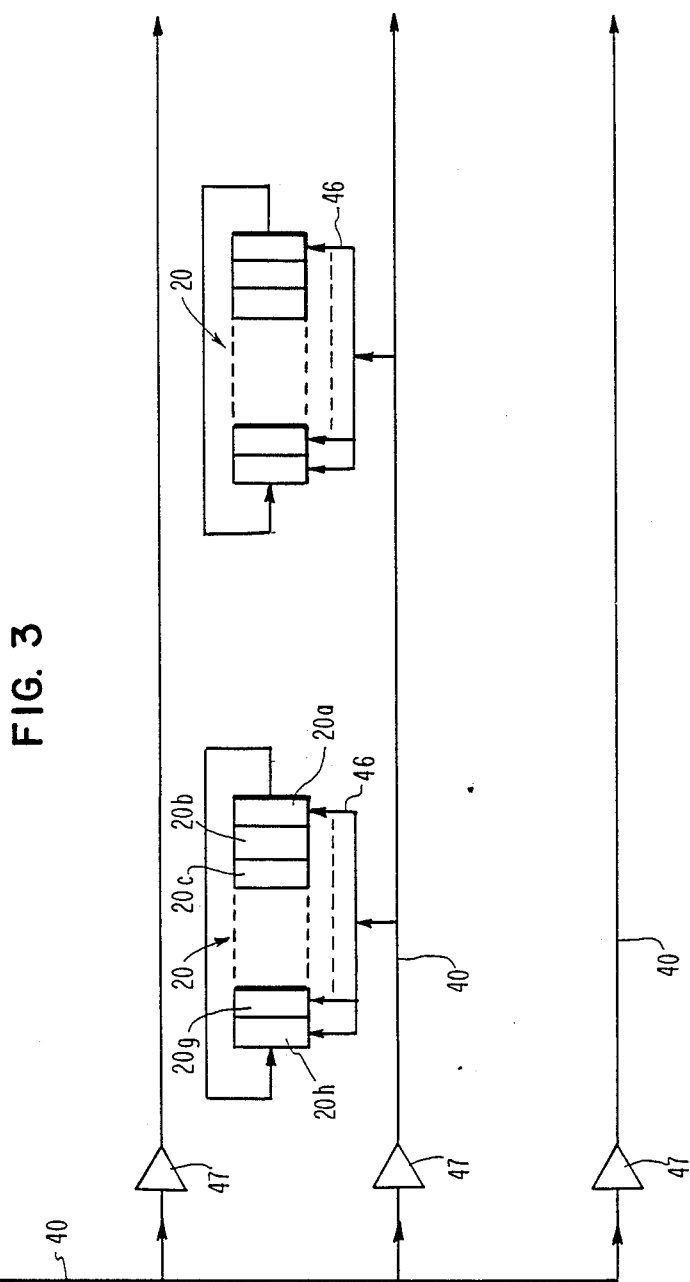
FIG. 3 is a schematic representation of the means for loading bits in each circulating memory.

Referring now to the drawings, and more particularly to FIG. 1, there is shown an overall schematic of the bit switch used in this invention. Shown in FIG. 1 is a bit switching array or switching matrix 10, and switch control circuit 12. Input multiplexers 301-364 are connected to the bit switching array via input lines 101-164, and output demultiplexers 401-464 are connected to the same bit switching array via output lines 201-264. The bit switching array 10 has horizontal lines 101H to 164H which are connected to input lines 101 to 164, respectively. The bit switching array also has vertical lines 201V to 264V which are connected to output lines 201-264, respectively. At the intersection of a horizontal line and a vertical line there is a crosspoint which serves to connect/disconnect a particular horizontal line with a particular vertical line. In this embodiment, each multiplexer, such as 301, is used to multiplex eight 4 Mbps signals into one 32 Mbps signal which is transmitted over respective input lines, however, many other bit rates are possible. For each crosspoint there is a shift register which controls the status of the crosspoint, i.e., whether tee crosspoint is opened or closed. (See 20 of FIG. 2.) Since the switching matrix 10 in this embodiment is a two sided 64×64 switch, the matrix 10 has 4096 crosspoints and the same number of shift registers. The shift registers and the means to control the loading of the shift registers are not shown in FIG. 1, but are shown in are shown in FIGS. 2 and 3.

The switch control circuit 12 is used to control the storing and shifting of the bits in the shift registers 20 which in turn control the opening and closing of the crosspoints 25. To store a bit into a shift register located at address (X, Y) during a particular time slot, the interface buses 501, 502, 503 and 504 between the switch control circuit 12 and switching matrix 10 provide the load bit (0/1), the Y address, the X address and the time slot respectively. This loading scheme is more fully described below. The particular time slot can be specified by the controller 12 With the apparatus of this invention, as will be explained below, the 4 Mbps data streams 3001-3512 are switched of the demultiplexers 401-464 on a bit by bit basis. These data streams are then demultiplexed into respective output lines 4001-4512.

Referring now to FIG. 2, there is shown a more detailed schematic of a circulating memory 20, more specifically a shift register, associated with a crosspoint 25. The particular crosspoint shown here is the one at the intersection of horizontal line 101H and vertical line 203V. For convenience, only one crosspoint 25 is shown, although as stated above, there are 4096 crosspoints in the switching matrix of this embodiment. The shift register 20 in this embodiment is used to store eight bits in eight slot positions 20a through 20h. Each bit stored in each slot position, such as 20b, is used to define the status of the associated switch 25 during a particular time slot, such as, for example, 28c. A collection of adjacent time slots such as 28a through 28h then make up a frame of eight time slots such as 26 shown in FIG. 2. A frame, however, can contain a different number of time slots, however, the number of slot positions in the shift register might also have to be changed. The slot positions should be at least equal to the number of time slots in a frame. However, significant switching delay will be introduced if the number of slot positions is very much greater then the number of time slots. The status of the particular crosspoint changes as the bits are shifted in the respective shift register. The term "status" of a crosspoint refers to whether the crosspoint is open or closed. Since the bits in each register are shifted simultaneously with the bits in the other registers, the status of the crosspoints of the bit switching chip change simultaneously with each other. This change occurs once each time slot, such as 28c. The status of a crosspoint during a time slot depends on whether there is a "1" or a "0" in the designated slot position 20a, for example, of a shift register such as 20. If there is a "1" in the designated slot position during a particular time slot then the crosspoint associated with that register closes during that particular time slot. When the switch is closed, a high or low from the input line, such as 101H for example, will be transmitted to the output line, such as 203V for example, as a high or low, respectively. Details of crosspoint 25 are described below.

Again referring to FIG. 2, a circulating memory can also be a random access memory (RAM) 27 with slot positions 21a through 21h and a pointer 29. In this case, the bits do not shift from one slot position to another, but rather a pointer is used for shifting access from one slot position (e.g., 21a) to another (e.g., 21b). The bit in each slot position that is being accessed is read so as to define the status of an associated crosspoint during a corresponding time slot. Another pointer 24 may also be used to load the bit in each slot position in each memory.

Referring now to FIG. 3, the shifting of the bits in each shift register 20 is accomplished using a 32 Mbps clock 45 to shift bits at the same rate (32 Mbps). The clock 45 is connected to all the shift registers through lines 40 and through the clock distribution 46 for each shift register so that a given clock pulse from the clock 45 is applied to all shift registers simultaneously. Thus, all shift registers are simultaneously shifted (see below), and the status of the crosspoints change at the same time. Local amplifiers 47 could be used on each line 40 to reduce loading on the clock 45. Whether local amplifiers are used would depend on the loading and speed requirements. In this embodiment, there is a clock cycle of approximately 31 nanoseconds with each cycle having two phases. The 31 nanoseconds correspond to the 32 Mbps clock. During the first phase (of approximately 10 nanoseconds), the crosspoints are set and during the second phase approximately 20 nanoseconds, data or voice are transmitted through the crosspoints. The two passes can have a different duration because the shifting of the bits in the shift register requires less time than the transmission of data through the crosspoints.

This shifting of bits in shift registers means that all bits, except the first bit are shifted one position to the right. For example, the bit (either a "0" or a "1") in slot position 20b is shifted one slot position to the right to slot position 20a, the bit in slot position 20c is shifted to slot position 20b and so on. The bit that was in slot position 20a, however, is shifted to slot position 20h. It is the bit that is in this slot position 20a, which is the designated slot position in this embodiment, that controls the status of the associated crosspoint during a particular time slot. The shift register 20 would work equally well if the bits were all shifted one slot position to the left with each clock pulse. The designated slot position could also be defined to correspond to any slot position such as 20c, for example.

Since the clock pulse for shifting the bits occurs at the rate of 32 Mbps, which is the same as the bit rate of the signals transmitted over the input lines, the status of a crosspoint can change after each bit is transmitted therethrough. Thus, a slot in this preferred embodiment contains only one bit. However, it is possible to have more than one bit in each slot and a lower clock rate, but a longer delay and/or a less efficient utilization of bandwidth is likely. For example, in this embodiment, if the clock rate for the shift registers were 16 Mbps, 2 bits per slot would be necessary for a 32 Mbps data transmission rate.

Figure 4:
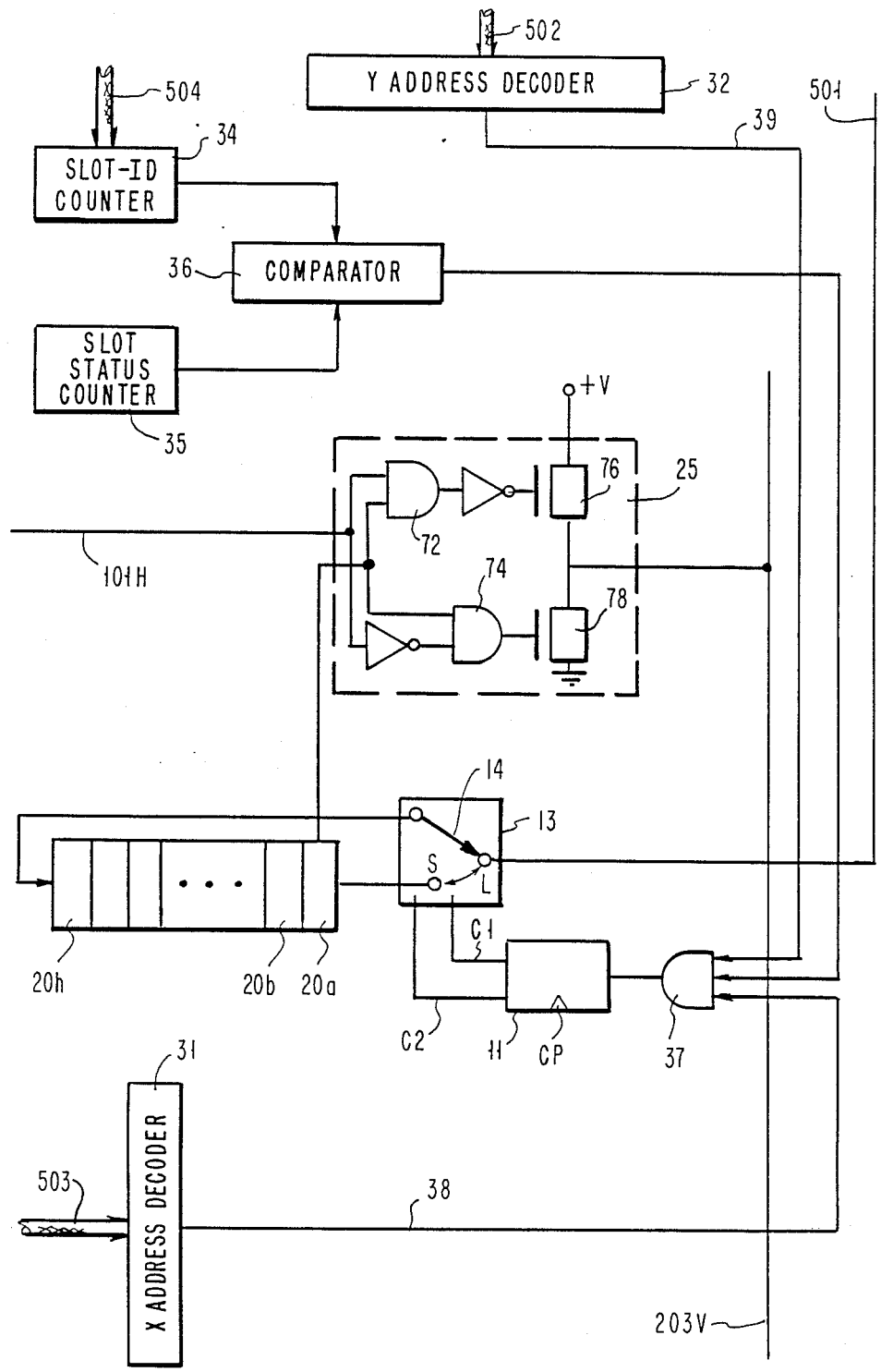
FIG. 4 is a schematic representation of the means for shifting the bits in each register.

Referring now to FIG. 4, there is shown a schematic of the means for loading bits in each circulating memory 20. More specifically, the memories loaded in this embodiment are the shift registers 20 described above. The combination of the X address decoder 31 and the Y address decoder 32 locates the particular crosspoint and the associated shift register that is to b loaded. The X address decoder locates the vertical line and the Y address decoder locates the horizontal line of the crosspoint at which the register to be loaded is located. The address decoders 31 and 32 are then used to apply a "1" to a specific AND gate which is associated with a specific register to be loaded through load lines 38 and 39. There are also other load lines from the X-address decoder and the Y-address decoder. From the X-address decoder there is one load line for each horizontal line, such as 101H, of the switching matrix. Also, from the Y-address decoder there is one load line for each vertical line, such as 203V, of the switching matrix. For convenience only one line is shown from each decoder. The slot status counter 35 is merely used to count the slots in a particular frame. In this embodiment the slot status counter 35 is merely a counter which counts from 0 to 7 at the rate of 32 Mbps. The slot status counter, thus in effect, keeps track of the movement of the bits in the register from one slot position to another, since these bits are shifted at the same rate of 32 Mbps. The slot-ID counter 34, on tee other hand, identifies the particular time slot during which a specific slot position in the register is to be loaded. The outputs of the slot-ID counter and the slot status counter are then applied to a comparator 36. The output of the slot status counter is the count of the-slot status counter, and the output of the slot counter is the particular time slot stored therein. When the count of the slot status counter is equal to the number of the slot stored in the slot-ID counter, the output 33 of the comparator is "1". This output is then applied to the AND gates 37 with one AND gate being associated with each register. The "1" that appears at the AND gate associated with the specific register to be loaded then allows the specific register to be loaded during the time slot identified in the slot-ID counter 34. The location of the specific register to be loaded was described above.

Again referring to FIG. 4, when a "1" appears at the output of the AND gate 37 a load control circuit 11, places a high on C2 and a low on C1. With C1 and C2 at a low and high respectively, the register control device 13, allows the register 20 to be loaded from line 501 from the switch control circuit 12. When a "0" appears at the output of the AND gate 37, the load control device places a high on C1 and a low on C2. With C1 high and C2 low, the register control device allows the bits in the register 20 to shift in a circulating manner. The register control device 13 is essentially a read-write selector which determines whether the bits in the shift register are circulating or being loaded therein. Both control devices 11 and 13 are well known to those skilled in the relevant art.

Again referring to FIG. 4, when the crosspoint 25 is closed, either the output line is grounded or the output line is electrically connected to a potential, such as . "Electrically connected" to a potential of V means that the output line as "placed" at a potential of V or a potential of V "appears" on the output line. For example, suppose there is a "1" (high) at slot position 20(a) of register 20. This "1" then closes the crosspoint; otherwise, the crosspoint is open. This "1" is applied to one input of each AND gate 72 and 74. If a "1" is to be transmitted from line 101H of the crosspoint then, a "0" appears at the input to p type field effect transistor 76 which then closes and connects output line 203V of the crosspoint to potential $+V$. This V on 203V signifies a high being transmitted. If a "0" (low) is to be transmitted from input line, then a "1" appears at the output of AND gate 74 closing n type field effect transistor 78 and thereby grounding output line 203V. This ground on output line 203V signifies a low being transmitted. Other types of transistors, such as p type and n type silicon transistors, could also be used.

Again referring to FIG. 4, the transistors 76 and 78 are a pair of field effect transistors whose sources are connected to each other and to an output line such as 203V. One of the transistors 76 has its drain connected to a voltage source of potential V, while the drain of the other transistor 78 is connected to ground. When transistor 76 closes as a result of a high appearing on an input line 101H, a potential V appears on output line 203V. When transistor 78 closes as a result of a low appearing on 101H, a ground potential appears on output line 203V.

The drain of transistor 76 could more generally be placed at say $V_1$ while the drain of transistor 78 could be placed at $V_2$ by an appropriate voltage source. Thus, closing transistor 76 would cause $V_1$ to appear on the corresponding output line. When $V_1$ is "appears" on the output line, the output line is "placed" at potential $V_1$, etc. Closing transistor 78, on the other hand, would cause $V_2$ to appear on the corresponding output line. The range of values for potentials V, $V_1$ and $V_2$ depend on the transistor used and are easily derived from information supplied by the manufacturer of the transistors. However, ground potential is preferred for at least one of the drain potentials.

The p type transistor could also be replaced by an n type transistor, while the n type transistor is replaced by a p type transistor. Appropriate biasing voltages and inverters would have to be used.

Figure 5:
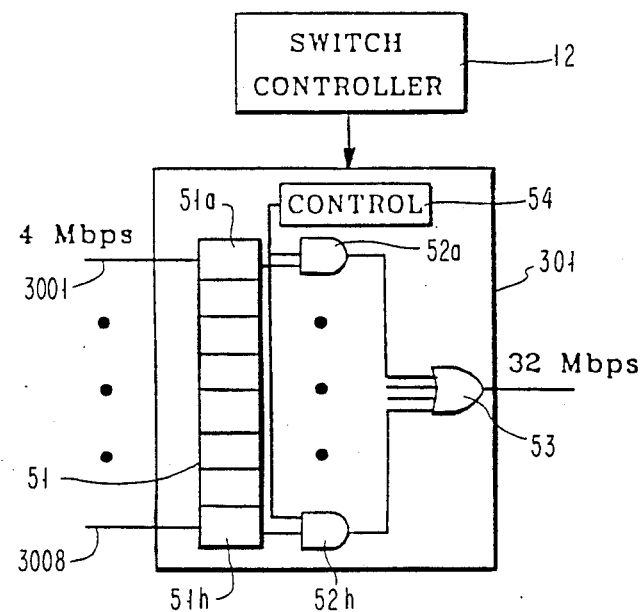
FIG. 5 is a schematic representation of a bit interleaver.

Referring now to FIG. 5, there is shown a more detailed schematic of one of the multiplexers 301-364 of FIG. 1. The 4 Mbps data streams, say 3001-3008, are applied to an input buffer 51 in buffers positions 51a through 51h, respectively. Each buffer position stores one bit from its respective data stream approximately every 250 nanoseconds in parallel with the storing of the other buffer positions. That is 8 bits are stored in the input buffer approximately every 250 nanoseconds.

Signals which specify the order of the bit sequence in 32 Mbps line from the multiplexer control 54 which specify the order of the bit sequence in 32 Mbps line are then applied to the AND gates 52(a) through 52(h) in serial fashion so as to produce a 32 Mbps signal, from the bits stored in input buffer 51, at the output of the OR gate 53. This 32 Mbps signal is then passed through a corresponding closed crosspoint with one bit being sent through the crosspoints during the second phase of the clock cycle referred to above. For the switching chips or switching matrix, CMOS technology was used because of its lower power dissipation and high density. It is cost effective to have more ports (input/output lines) on a single chip. A 64×64 switching chip has about 200 I/O pins. 128 for the I/O lines, plus pins for power, ground and control. 200 I/O pins is about the limit for an 8 mm×8 mm 2 micron CMOS chip without special design. The above switching chip is capable of storing approximately 32 Kb in shift registers. Thus, for $(64)^2$ crosspoints, 8 bits are stored in the register at each crosspoint. The above 8 bits/register would be used in the case of 4 Mbps streams which are switched as one unit. However, for 4 Mbps streams made up of PCM voice channels which are switched by individual voice channels, 512 bits per register would be used. The storage limitation, however, would limit the number of crosspoints pe chip to about 64 or to 16 I/O lines.

It is thought that the apparatus and method of the present invention and many of its attendant advantages will be understood from the foregoing description, and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described out invention, what we claim as new, and desire by Letters Patent is:

1. A bit switch, comprising:
    (a) a plurality of crosspoints;
    (b) a circulating memory associated with each of the crosspoints with each memory being associated with at most one crosspoint, each memory for storing a plurality of bits therein, each bit in each memory defining the status of the respective memory's associated crosspoint during a particular time slot;
    (c) means for loading the bits in each memory; and
    (d) means for shifting the bits in each respective memory approximately simultaneously with the shifting of the bits in each other memory, the bit of each memory that is shifted to a designated slot position of each memory during a particular time slot being used to define the status of its associated crosspoint during the particular time slot.

2. A bit switch as recited in claim 1, wherein the means, for shifting the bits in the circulating memories, shifts the bits in each memory with such a frequency as to allow the transmission of only one bit through each closed crosspoint in a given time slot.

3. A bit switch as recited in claim 1, wherein the number of slot positions circulating memory corresponds to the number of time slots in a frame.

4. A bit switch as recited in claim 1, wherein the means for simultaneously shifting the bits in each circulating memory comprises:
    a clock for generating a clock pulse for shifting the bits in each memory.

5. A bit switch, comprising:
    (a) a plurality of crosspoints;
    (b) a shift register associated with each of the crosspoints with each register being associated with at most one crosspoint, each register for storing a plurality of bits therein, each register comprising a plurality of slot positions with at most one bit being stored in each position, each bit in each position being used to define the status of an associated crosspoint during a particular time slot;
    (c) means for loading the bits in each register; and
    (d) means for shifting, in response to a single bit, the bits in each respective register approximately simultaneously with the shifting of the bits in each other register, the bit of each register that is shifted to a designated slot position of each register during a particular time slot being used to define the status of the respective register's associated crosspoint during that particular time slot, the bits being shifted in each register at such a rate as to allow only at most one bit to be transmitted through each closed crosspoint during a given time slot.

6. A bit switch comprising:
    (a) a plurality of crosspoints;
    (b) a circulating memory associated with each of the crosspoints with each memory being associated with at most one crosspoint, each memory for storing a plurality of bits therein, each bit in each memory defining the status of the respective memory's associated crosspoint during a particular time slot;
    (c) means for loading the bits in each memory; and
    (d) means for shifting, in response to a single bit, access from one slot position to another in each memory approximately simultaneously with the shifting of access from one slot position to another in each other memory, the bit, in the slot position being accessed in each memory during each corresponding time slot, being read to define the status of a respective memory's associated crosspoint during the corresponding time slot.

7. A method of switching voice and data through a switching matrix, comprising the steps of:
    (a) storing a plurality of bits in circulating memories, with a particular circulating memory being associated with each crosspoint of the switching matrix with each memory being associated with at most one crosspoint, with the bits being stored in respective slot positions of each circulating memory, and with each bit of each circulating memory representing the status of an associated crosspoint during particular time slots which correspond to the respective slot positions;
    (b) shifting, in response to a single bit, the bits in each circulating memory approximately simultaneously with the shifting of the bits in each other memory of the switching matrix; and
    (c) changing approximately simultaneously the status of the crosspoints, in response to the shifting of the bits in each said memory associated with a crosspoint.

8. A method as recited in claim 7, further comprising the step of:
    transmitting at most one bit of data or voice through each closed crosspoint during a given time slot, wherein any of the crosspoints can change status during any given time slot including consecutive time slots.

9. A method as recited in claim 8, wherein the input/output signals to the switching matrix are 32 Mbps streams and wherein the status of the crosspoints changes simultaneously at the rate of 32 Mbps and wherein there are approximately 4096 crosspoints.

10. A method of switching voice and data through a switching matrix, comprising the steps of:
(a) storing a plurality of bits in each of a plurality of shift registers, with a particular shift register being associated with each crosspoint of the switching matrix, with each memory being associated with at most one crosspoint with bits in each register being stored in respective slot positions of each register, each bit representing the status of the associated crosspoint for the respective register during a particular time slot which corresponds to the slot position in which the respective bit is stored;
(b) shifting, in response to a clock pulse, the bits in each shift register from one slot position of each register to another slot position of the same register, simultaneously with the shifting of the bits in each other register of the switching matrix;
(c) changing the status of each crosspoint, during each respective time slot in response to the bit that is in a designated slot position of each associated shift register during each respective time slot; and
(d) transmitting at most one bit of data or voice through each closed crosspoint during a given time slot, wherein any of the crosspoints can change status once during a given time slot including consecutive time slots.

* * * * *